United States Patent
Lee et al.

(10) Patent No.: US 10,609,480 B2
(45) Date of Patent: Mar. 31, 2020

(54) METHOD AND ELECTRONIC DEVICE FOR EXECUTING FUNCTION USING A PLURALITY OF MICROPHONES

(71) Applicant: Samsung Electronics Co., Ltd., Gyeonggi-do (KR)

(72) Inventors: Daegi Lee, Gyeonggi-do (KR); Daegyu Kang, Gyeonggi-do (KR); Seokhyun Mun, Gyeonggi-do (KR); Yongwook Park, Seoul (KR); Hyunmin Oh, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/182,743

(22) Filed: Nov. 7, 2018

(65) Prior Publication Data

US 2019/0141444 A1 May 9, 2019

(30) Foreign Application Priority Data

Nov. 8, 2017 (KR) .................. 10-2017-0148044

(51) Int. Cl.
| | |
|---|---|
| *H04R 3/00* | (2006.01) |
| *G10L 25/51* | (2013.01) |
| *H04R 1/40* | (2006.01) |
| *G06F 3/16* | (2006.01) |
| *G10L 15/00* | (2013.01) |

(52) U.S. Cl.
CPC .............. *H04R 3/005* (2013.01); *G06F 3/167* (2013.01); *G10L 25/51* (2013.01); *H04R 1/406* (2013.01); *G10L 15/00* (2013.01)

(58) Field of Classification Search
CPC ............. H04M 11/04; H04M 1/72536; H04M 1/72569; H04M 2242/04; H04M 2250/22; H04M 3/5116; H04W 4/12; H04W 4/90; H04W 76/50; H04W 64/00; H04W 84/18; H04R 1/406; H04R 3/005
USPC .......... 381/92, 150, 369, 95, 62, 355; 700/94
See application file for complete search history.

(56) References Cited

U.S. PATENT DOCUMENTS

| | | | |
|---|---|---|---|
| 8,451,254 B2 | 5/2013 | Bisutti et al. | |
| 9,043,210 B1* | 5/2015 | Adcock | G10L 15/183 379/88.01 |
| 2005/0015250 A1* | 1/2005 | Davis | G06F 3/03545 704/231 |

(Continued)

FOREIGN PATENT DOCUMENTS

| | | |
|---|---|---|
| KR | 10-2013-0048578 A | 5/2013 |
| WO | 2016/099903 A1 | 6/2016 |

OTHER PUBLICATIONS

European Search Report dated Mar. 8, 2019.
European Search Report dated Dec. 17, 2019.

*Primary Examiner* — Lun-See Lao
(74) *Attorney, Agent, or Firm* — Cha & Reiter, LLC

(57) ABSTRACT

Certain embodiments of the present disclosure are related to an apparatus and a method for executing a function corresponding to pattern data generated using a plurality of microphones. An electronic device may include a plurality of microphones and a processor. The processor may be configured to detect a user input at the plurality of the microphones, to generate pattern data based on the user input, and to execute a function corresponding to the pattern data.

18 Claims, 18 Drawing Sheets

(56) References Cited

U.S. PATENT DOCUMENTS

| | | | |
|---|---|---|---|
| 2014/0156269 A1* | 6/2014 | Lee | G06F 1/3206 |
| | | | 704/231 |
| 2014/0222436 A1* | 8/2014 | Binder | G06F 3/167 |
| | | | 704/275 |
| 2015/0161998 A1* | 6/2015 | Park | G10L 15/24 |
| | | | 704/231 |
| 2016/0179461 A1* | 6/2016 | Leon | G06F 1/1684 |
| | | | 345/156 |
| 2016/0360332 A1 | 12/2016 | Shin et al. | |
| 2018/0042542 A1* | 2/2018 | Cronin | G10L 25/63 |

* cited by examiner

METHOD AND ELECTRONIC DEVICE FOR EXECUTING FUNCTION USING A PLURALITY OF MICROPHONES

CROSS-REFERENCE TO RELATED APPLICATION(S)

This application is based on and claims priority under 35 U.S.C. § 119 to Korean Patent Application No. 10-2017-0148044, filed on Nov. 8, 2017, in the Korean Intellectual Property Office, the disclosure of which is incorporated by reference herein in its entirety.

TECHNICAL FIELD

The present disclosure relates generally to an apparatus and a method for executing a function corresponding to pattern data generated using a plurality of microphones in an electronic device.

BACKGROUND

With advances in information communication technology and semiconductor technology, an electronic device may provide various functions such as a broadcasting function, a wireless Internet function, a camera function, a user authentication function, or an electronic payment function. To enable a user to easily use such various functions, the electronic device may receive a user's voice through a microphone and provide a function corresponding to the user's voice.

To improve user voice recognition, the electronic device may include a plurality of microphones at particular positions (e.g., at the top of the electronic device) of the electronic device. However, if the electronic device, which includes a separate physical input means (e.g., a home button) for detecting a user's physical input, adds or includes a microphone at a specific position, a structure of the electronic device may be complicated, a manufacturing cost may increase, and a design of the electronic device may be limited.

SUMMARY

To address the above-discussed deficiencies of the prior art, it is a primary aspect of the present disclosure to provide an apparatus and a method for executing a function corresponding to pattern data generated using a plurality of microphones in an electronic device.

According to certain embodiments, an electronic device may include a plurality of microphones and a processor. The processor may be configured to detect a user input at the plurality of the microphones, to generate pattern data based on the user input, and to execute a function corresponding to the pattern data.

According to certain embodiments, a method for operating an electronic device may include detecting a user input at a plurality of microphones, generating pattern data based on the user input, and executing a function corresponding to the pattern data.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Hereinafter, certain embodiments are described in detail with reference to the accompanying drawings. In the following certain embodiments, well-known functions or constitutions will not be described in detail if they would unnecessarily obscure the subject matter of the invention. Also, terminologies to be described below are defined in consideration of functions in the certain embodiments and may vary depending on a user's or an operator's intention or practice. Thus, their definitions should be defined based on all the contents of the specification.

Figure 1:
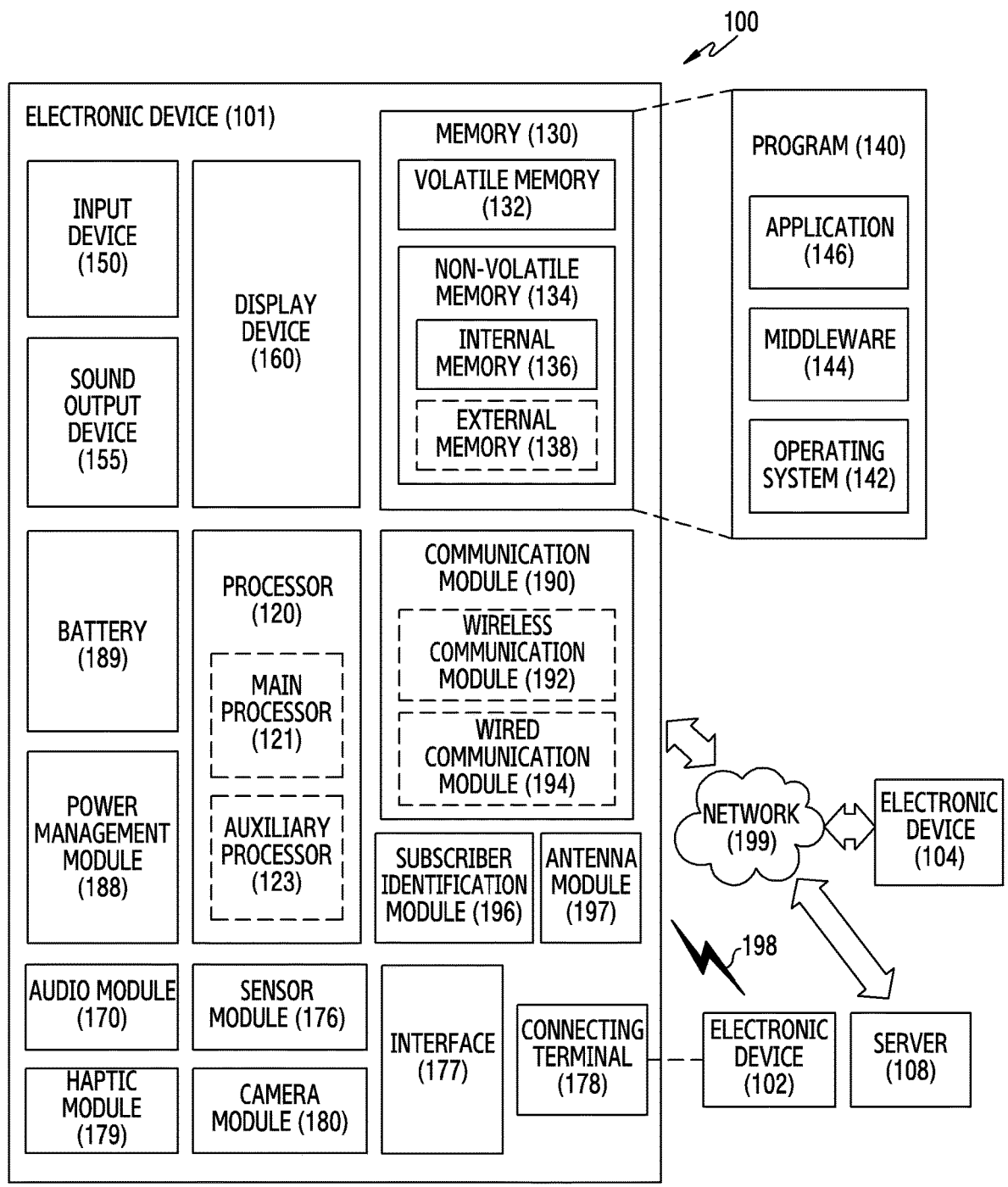
FIG. 1 is a block diagram of an electronic device for executing a function corresponding to pattern data generated using a plurality of microphones in a network environment according to certain embodiments.

FIG. 1 is a block diagram of an electronic device for executing a function corresponding to pattern data generated using a plurality of microphones in a network environment according to certain embodiments.

FIG. 1 is the block diagram of an electronic device 101 for executing a function corresponding to pattern data generated using microphones in a network environment 100 according to certain embodiments. Referring to FIG. 1, the electronic device 101 in the network environment 100 may communicate with an electronic device 102 via a first network 198 (e.g., a short-range wireless communication network), or with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one (e.g., the display device 160 or the camera module 180) of the components may be omitted from the electronic device 101, or one or more other components may be added in the electronic device 101. In some embodiments, some of the components may be integrated. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load and process a command or data received from other component (e.g., the sensor module 176 or the communication module 190) in a volatile memory 132, and store resulting data in a nonvolatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or a communication processor) which is operable independently from or in conjunction with the main processor 121, and additionally or alternatively, is adapted to consume less power than the main processor 121, or is specific to a designated function. The auxiliary processor 123 may be separated from or embedded in the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is inactive (e.g., sleeping) or together with the main processor 121 while the main processor 121 is active (e.g., executes an application). According to an embodiment, the auxiliary processor 123 (e.g., an image signal processor or a communication processor) may be implemented as part of other component (e.g., the camera module 180 or the communication module 190) functionally related to the auxiliary processor 123. The memory 130 may store various data used by at least one component (e.g., the processor 120 or the sensor module 176) of the electronic device 101, for example, software (e.g., the program 140) and input data or output data for a command related thereto. The memory 130 may include the volatile memory 132 or the nonvolatile memory 134.

The program 140 is software stored in the memory 130 and may include, for example, an operating system 142, middleware 144, or an application 146.

The input device 150 may receive a command or data to be used by other component (e.g., the processor 120) of the electronic device 101, from the outside (e.g., a user) of the electronic device 101, and may include, for example, a microphone, a mouse, or a keyboard.

The sound output device 155 may output sound signals to the outside of the electronic device 101, and may include, for example, a speaker used for general purposes such as playing multimedia or playing record, or a receiver used for incoming calls. According to an embodiment, the receiver may be implemented as separate from, or as part of the speaker.

The display device 160 may visually provide information to the user of the electronic device 101, and may include, for example, a display, a hologram device, or a projector and control circuitry to control a corresponding device. According to an embodiment, the display device 160 may include touch circuitry or a pressure sensor, for measuring intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., the electronic device 102 (e.g., the speaker or the headphone)) wiredly or wirelessly coupled with the electronic device 101.

The sensor module 176 may generate an electrical signal or a data value corresponding to an operational state (e.g., power or temperature) of the electronic device 101 or an external environmental state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol for wired or wireless connection with the external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector for physically interconnecting the electronic device 101 with the external electronic device (e.g., the electronic device 102), for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by the user via his/her tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101 and may be implemented as at least part of, for example, a power management integrated circuit (PMIC).

The battery 189 may supply power to at least one component of the electronic device 101 and may include, for example, a primary cell which is not rechargeable, a secondary cell which is rechargeable, or a fuel cell.

The communication module 190 may establish a wired or wireless communication channel between the electronic device 101 and the external electronic device (e.g., the electronic device 102, the electronic device 104, or the server 108) and support communications via the established communication channel. The communication module 190 may include one or more communication processors which are operable independently from the processor 120 (e.g., the application processor) and supports the wired communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). Using a corresponding communication module, the communication module 190 may communicate with the external electronic device via the first network 198 (e.g., a short-range communication network such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of the communication module 190 may be implemented as a single chip or separate chips.

According to an embodiment, the wireless communication module 192 may identify and authenticate the electronic device 101 in a communication network using user information stored in the subscriber identification module 196.

The antenna module 197 may include one or more antennas for transmitting or receiving a signal or power to or from the outside. According to an embodiment, the communication module 190 (e.g., the wireless communication module 192) may transmit or receive a signal to or from the external electronic device over an antenna suitable for a communication scheme.

Some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 needs to perform a function or a service automatically or in response to a request, the electronic device 101, instead of, or in addition to, executing the function or the service, may request the external electronic device to perform at least part of the function or the service. The external electronic device receiving the request may perform the requested function or an additional function, and transfer an outcome to the electronic device 101. The electronic device 101 may provide the requested function or service, with or without further processing the outcome. For doing so, cloud computing, distributed computing, or client-server computing technology may be used, for example.

Figure 2:
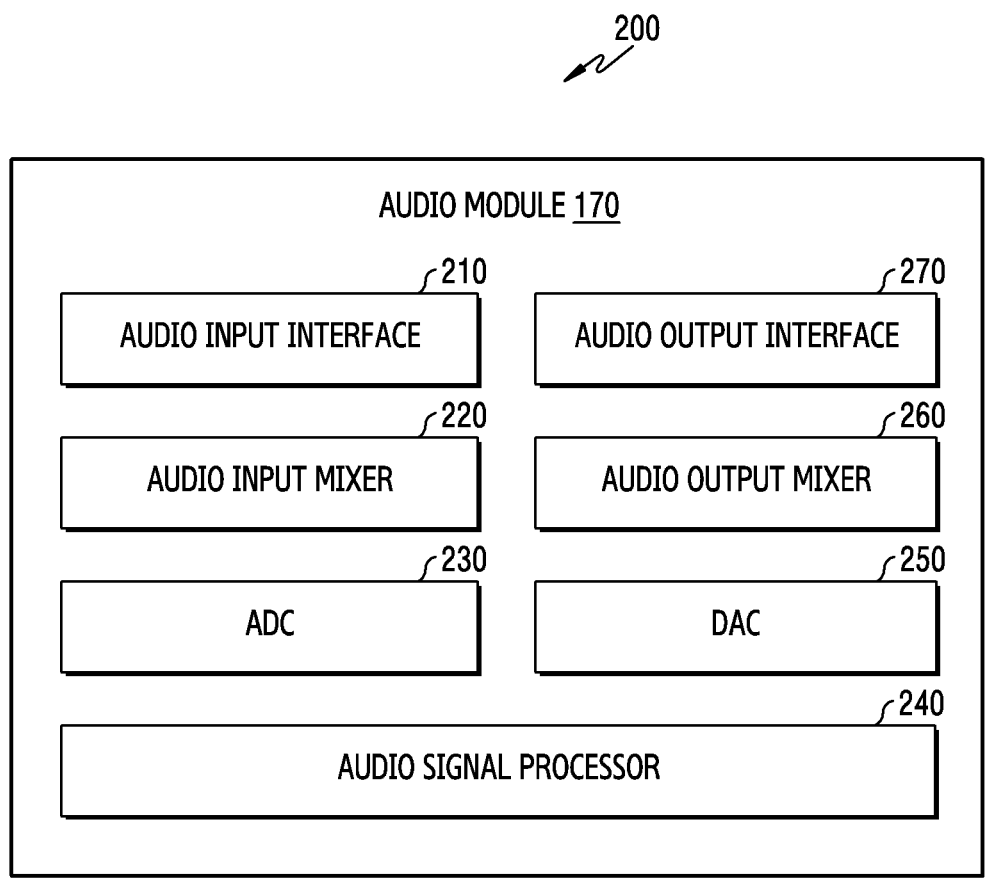
FIG. 2 is a block diagram of an audio module for executing a function using a plurality of microphones according to certain embodiments.

FIG. 2 is a block diagram of an audio module for executing a function using a plurality of microphones according to certain embodiments.

FIG. 2 is a block diagram 200 of the audio module 170 according to certain embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) which is configured as part of the input device 150 or separately from the electronic device 101. For example, if an audio signal is obtained from the external electronic device 102 (e.g., a headset or a microphone), the audio input interface 210 may receive the audio signal by connecting with the external electronic device 102 wiredly via the connecting terminal 178, or wirelessly (e.g., Bluetooth communication) via the wireless communication module 192. According to an embodiment, the audio input interface 210 may receive a control signal (e.g., a volume control signal received via an input button) regarding the audio signal obtained from the external electronic device 102. The audio input interface 210 may include a plurality of audio input channels, and may receive a different audio signal via a corresponding one of the audio input channels, respectively. According to an embodiment, additionally or alternatively, the audio input interface 210 may receive an audio signal from other component (e.g., the processor 120 or the memory 130) of the electronic device 101.

The audio input mixer 220 may synthesize a plurality of inputted audio signals into at least one audio signal. According to an embodiment, the audio input mixer 220 may synthesize a plurality of analog audio signals inputted via the audio input interface 210, into at least one analog audio signal.

The ADC 230 may convert an analog audio signal into a digital audio signal. According to an embodiment, the ADC 230 may convert an analog audio signal received via the audio input interface 210 or, additionally or alternatively, an analog audio signal synthesized via the audio input mixer 220, into a digital audio signal.

The audio signal processor 240 may perform various processing on a digital audio signal received via the ADC 230 or a digital audio signal received from other component of the electronic device 101. For example, the audio signal processor 240 may change a sampling rate, apply one or more filters, process interpolation, process amplification or attenuation (e.g., amplify or attenuate a whole or partial frequency bandwidth), process noise (e.g., attenuate noise or echoes), change a channel (e.g., switch between mono and stereo), mix, or extract a specified signal, for one or more digital audio signals. According to an embodiment, one or more functions of the audio signal processor 240 may be implemented in the form of an equalizer.

The DAC 250 may convert a digital audio signal into an analog audio signal. According to an embodiment, the DAC 250 may convert a digital audio signal processed by the audio signal processor 240 or a digital audio signal obtained from other component of the electronic device 101, into an analog audio signal.

The audio output mixer 260 may synthesize a plurality of audio signals, which are to be outputted, into at least one audio signal. According to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260, to the outside of the electronic device 101 via the sound output device 155 (e.g., a speaker (e.g., a dynamic driver or a balanced armature driver), or a receiver). According to an embodiment, the sound output device 155 may include a plurality of speakers. In such a case, the audio output interface 270 may output audio signals having a plurality of different channels (e.g., stereo channels or 5.1 channels) through at least some of the speakers. According to an embodiment, the audio output interface 270 may be connected with the external electronic device 102 (e.g., an external speaker or a headset) wiredly via the connecting terminal 178 or wirelessly via the wireless communication module 192, to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) which is capable of amplifying an analog audio signal inputted via the audio input interface 210 or an audio signal to be outputted via the audio output interface 270. According to an embodiment, the audio amplifier may be configured as a separate module from the audio module 170.

The electronic device according to certain embodiments of the present disclosure may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments of the present disclosure as set forth herein may be implemented as software (e.g., the program 140) including one or more instructions which are stored in a machine-readable storage medium (e.g., an internal memory 136 or an external memory 138) which is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments of the present disclosure, an electronic device may include a plurality of microphones, and a processor, wherein the processor is configured to detect a user input at the plurality of the microphones, to generate pattern data based on the user input, and to execute a function corresponding to the pattern data.

According to certain embodiments, the user input may include at least one of sweeping, blocking, or tap.

According to certain embodiments, the processor may be configured to identify input signal levels of the plurality of the microphones, to identify a difference between the input signal level of one of the microphones and the input signal levels of other microphones, to identify whether the difference exceeds a reference range, and if the difference exceeds the reference range, to generate the pattern data.

According to certain embodiments, the processor may be configured to compare the pattern data with a reference pattern list, to identify whether there is a reference pattern corresponding to the pattern data in the reference pattern list, and if there is the reference pattern corresponding to the pattern data, to execute the function corresponding to the pattern data.

According to certain embodiments, the processor may be configured to, if there is no reference pattern corresponding to the pattern data, request reference pattern information corresponding to the pattern data from an external device, to receive the reference pattern information from the external device, and to execute the function corresponding to the pattern data, based on the reference pattern information.

According to certain embodiments, the processor may be configured to request reference pattern information corresponding to the pattern data from an external device, to receive the reference pattern information from the external device, and to execute the function corresponding to the pattern data, based on the reference pattern information.

According to certain embodiments, the processor may be configured to identify the function corresponding to the pattern data, to determine whether to associate with an external device, based on the identified function, and if determining to associate with the external device, to transmit a message for requesting to execute the identified function to the external device.

According to certain embodiments, the processor may be configured to, if determining not to associate with the external device, execute the function corresponding to the pattern data at the electronic device.

According to certain embodiments, the processor may be configured to identify status information of the electronic device, to determine whether an association event occurs, based on the status information, and if the association event occurs, to transmit a message for requesting to execute the function corresponding to the pattern data, to the external device.

According to certain embodiments, the status information may include at least one of a battery level, processor usage, set display brightness, current consumed by the electronic device, radio frequency (RF) transmit power, or sensing information regarding a motion of the electronic device.

Figure 3:
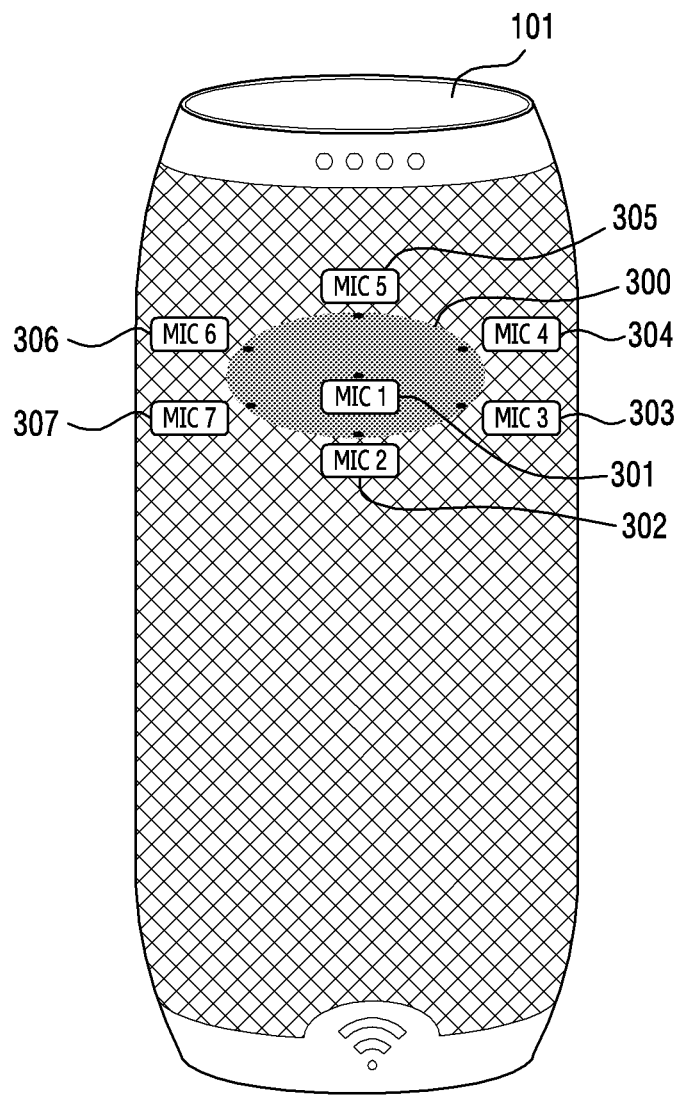
FIG. 3 is a diagram of an electronic device including a plurality of microphones according to certain embodiments of the present disclosure.

FIG. 3 is a diagram of an electronic device including a plurality of microphones according to certain embodiments of the present disclosure. In the following, the electronic device may include the electronic device 101 of FIG. 1 or at least part (e.g., the processor 120) of the electronic device 101.

Referring to FIG. 3, the electronic device 101 may include an input device and a sound output device. For example, the electronic device 101 may include a plurality of microphones 300 and a sound output device (e.g., a speaker). For example, the microphones 300 may combine at least one of a first microphone 301 through a seventh microphone 307, and may be disposed in an upper region of the electronic device 101. For example, the electronic device 101 may recognize a user voice through the microphones 300, and output a sound through the speaker. The structure of the microphones 300 in FIG. 3 is merely an example, and the microphones 300 may include one or more of the first microphone 301 through the seventh microphone 307, or include more microphones.

According to an embodiment, the processor 120 may detect a user input through the microphones 300. For example, the user input may include a voice input and a physical input, and the physical input may indicate that the user touches at least part of the microphones 300, or a user's body part approaches the microphones 300. The user's physical input may include sweeping, blocking, or tap.

According to an embodiment, the processor 120 may generate pattern data. For example, if detecting a user input through the microphones 300, the processor 120 may analyze a signal inputted to the microphones 300 and generate pattern data.

According to an embodiment, the processor 120 may execute a function corresponding to the pattern data. For example, the processor 120 may compare the pattern data with a reference pattern list, and identify a reference pattern corresponding to the pattern data in the reference pattern list. The processor 120 may execute a function corresponding to the identified reference pattern.

Figure 4A:
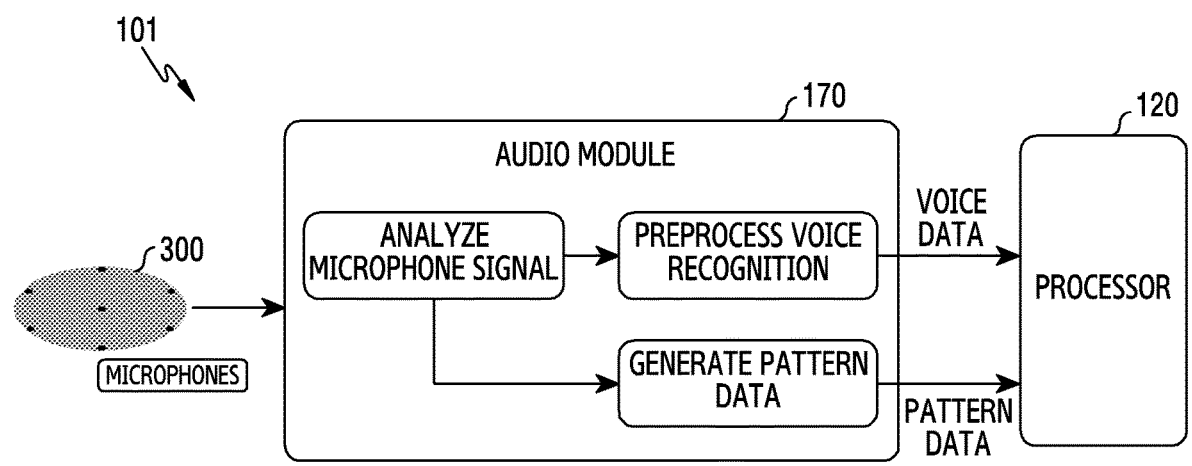
FIG. 4A and FIG. 4B are block diagrams of an electronic device according to certain embodiments of the present disclosure.
Figure 4B:
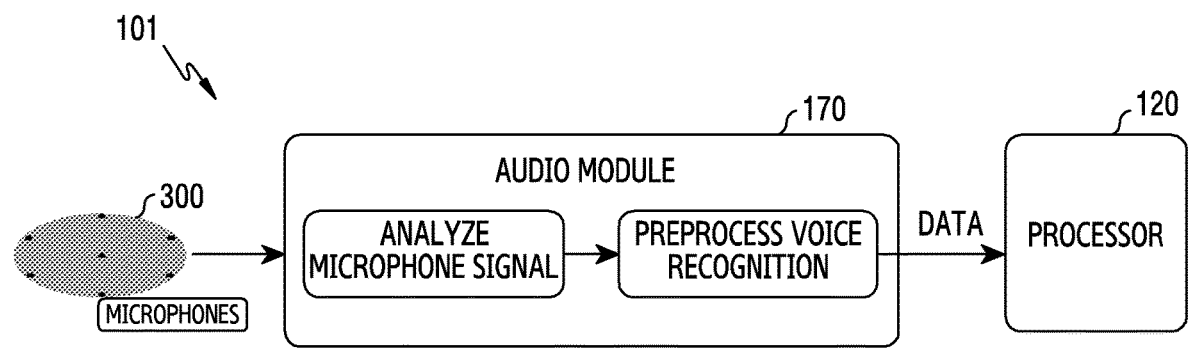

FIG. 4A and FIG. 4B are block diagrams of an electronic device according to certain embodiments of the present disclosure. In the following, the electronic device may include the electronic device 101 of FIG. 1, the electronic device 101 of FIG. 3, or at least part (e.g., the processor 120) of the electronic device 101.

Referring to FIG. 4A, the electronic device 101 may include microphones 300, an audio module 170, and a processor 120. For example, the electronic device 101 may detect an input signal through the microphones 300. For example, the electronic device 101 may analyze the input signal of the microphones 300 using the audio module 170, and generate pattern data based on the input signal which is analyzed before voice recognition preprocessing. On the contrary, the electronic device 101 may generate the pattern data after or substantially concurrently with the voice recognition preprocessing of the audio module 170. For example, the electronic device 101 may transmit the voice data and the pattern data to the processor 120 through the audio module 170. For example, the processor 120 may store the received voice data as voice content in the memory 130 of FIG. 1 or execute a function corresponding to the voice data, and execute a function corresponding to the received pattern data.

Referring to FIG. 4B, the electronic device 101 may include the microphones 300, the audio module 170, and the processor 120. For example, the electronic device 101 may analyze an input signal of the microphones 300 using the audio module 170, and perform the voice recognition preprocessing based on the analyzed input signal of the microphones 300. For example, the processor 120 may generate voice data and pattern data from the data received from the audio module 170. In addition, the processor 120 may store the generated voice data as voice content in the memory 130 or execute a function corresponding to the voice data, and execute a function corresponding to the generated pattern data.

Figure 5:
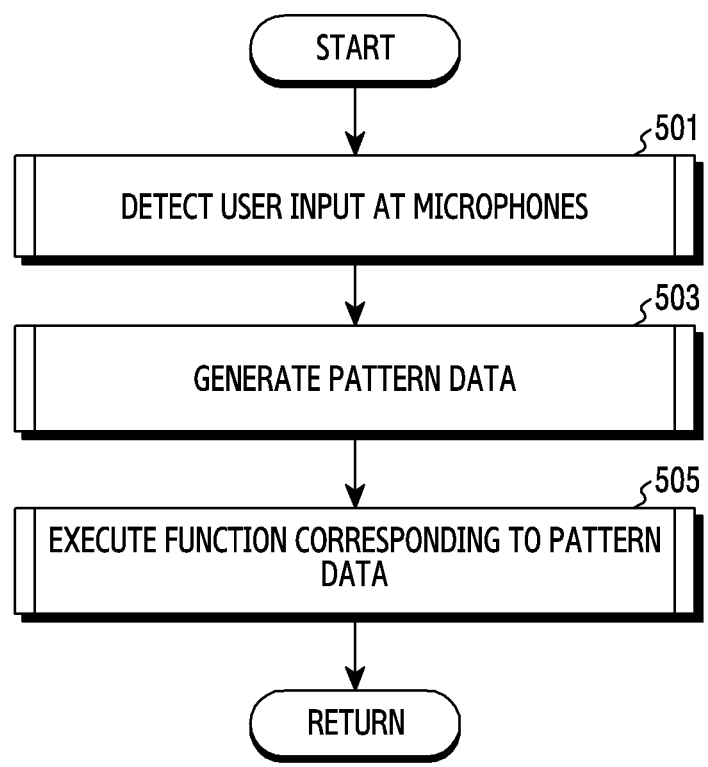
FIG. 5 is a flowchart of a method for executing a function based on pattern data corresponding to a user input in an electronic device according to certain embodiments of the present disclosure.

FIG. 5 is a flowchart of a method for executing a function based on pattern data corresponding to a user input in an electronic device according to certain embodiments of the present disclosure. FIG. 6A through FIG. 6E are diagrams of a user input at microphones of an electronic device according to certain embodiments of the present disclosure. In the following, the electronic device may include the electronic device 101 of FIG. 1, the electronic device 101 of FIG. 3, the electronic device 101 of FIG. 4A and FIG. 4B, or at least part (e.g., the processor 120) of the electronic device 101.

Figure 6A:
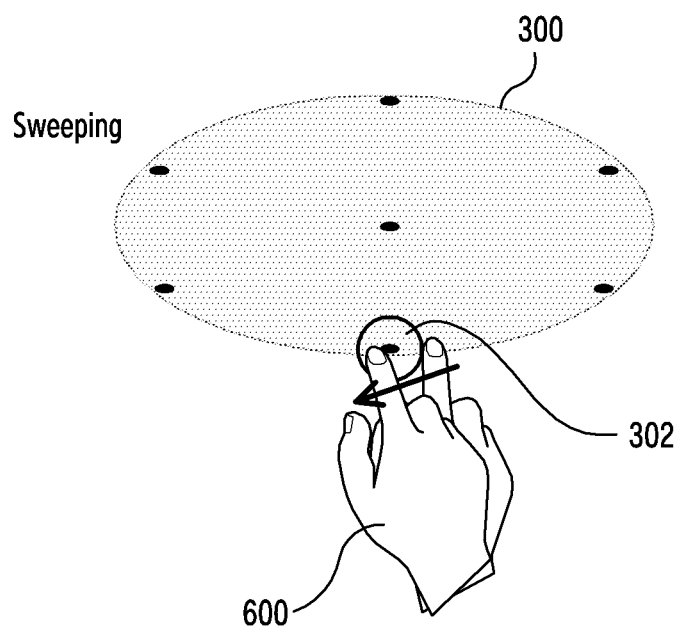
FIG. 6A, FIG. 6B, FIG. 6C, FIG. 6D and FIG. 6E are diagrams of a user input at microphones of an electronic device according to certain embodiments of the present disclosure.
Figure 6B:
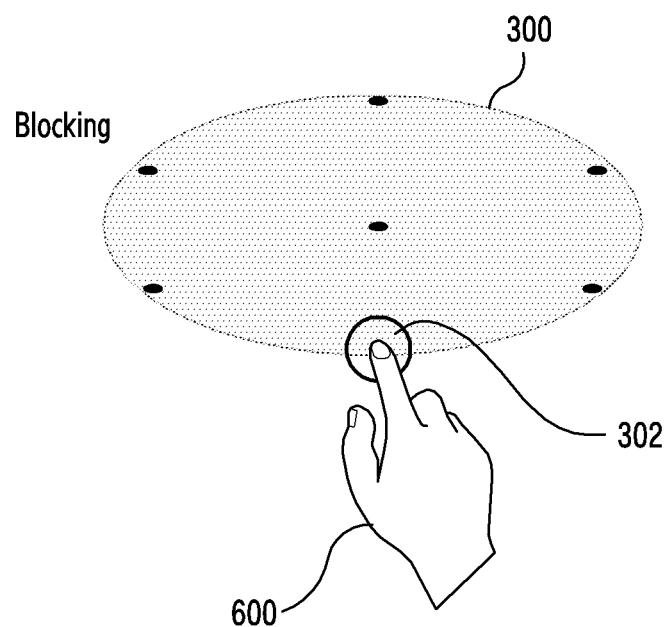
Figure 6C:
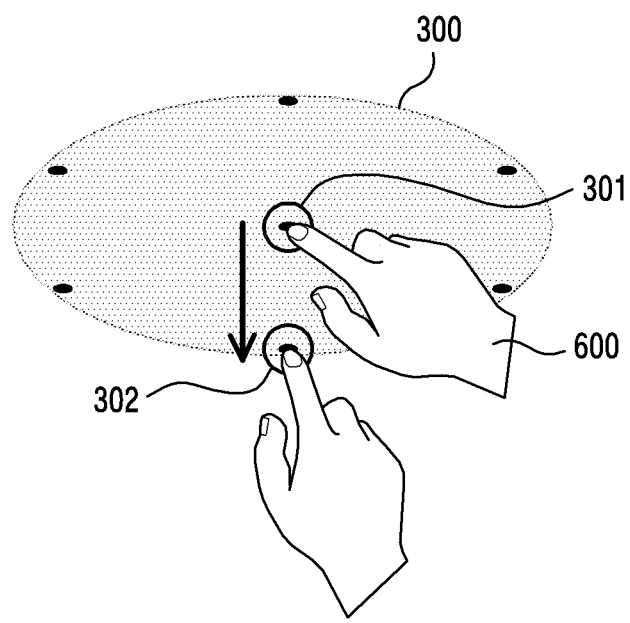
Figure 6D:
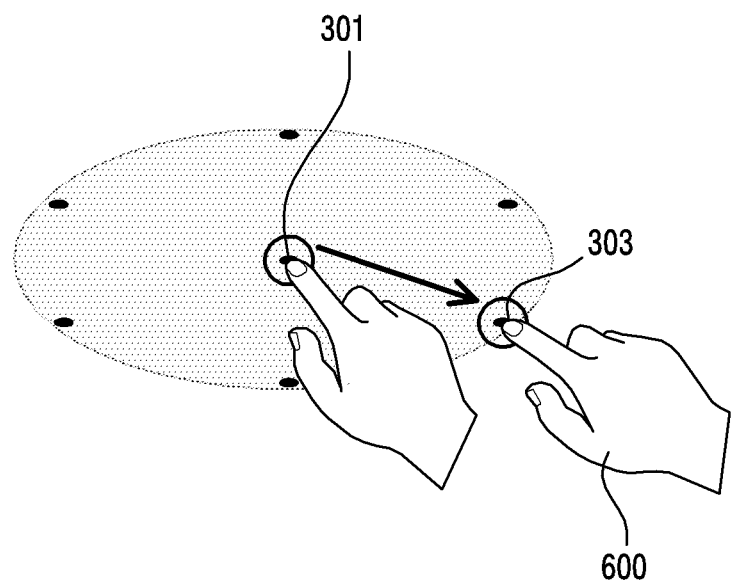

Referring to FIG. 5, the electronic device 101 may detect a user input at the microphones 300 of FIG. 6A through FIG. 6E in operation 501. For example, the processor 120 may detect a user input which touches or approaches the microphones 300, through the microphones 300. For example, the user input may include a user's voice input, a user's physical input, and so on. For example, the physical input may indicate that the user touches at least part of the microphones 300, or a user's body part approaches the microphones 300. The user's physical input may include sweeping, blocking, or tap. For example, the user may input a gesture (e.g., sweeping) which crosses a hole of the second microphone 302 as shown in FIG. 6A. The user may input a gesture (e.g., blocking) which blocks the hole of the second microphone 302 as shown in FIG. 6B. The user may input a gesture (e.g., sweeping) which moves from the first microphone 301 toward the second microphone 302 as shown in FIG. 6C. The user may input a gesture (e.g., sweeping) which moves from the first microphone 301 toward the third microphone 303 as shown in FIG. 6D.

In operation 503, the electronic device 101 may generate pattern data. For example, if a user input is detected through the microphones 300, the processor 120 may analyze a signal inputted to the microphones 300 and generate pattern data. For example, the signal inputted to the microphones 300 may include a sound produced by the user input and noise around the electronic device 101. For example, the processor 120 may generate pattern data by comparing input signal levels of the microphones 300 with input signal levels of other microphones 300, which shall be elucidated in FIG. 7.

According to an embodiment, the processor 120 may generate pattern data by analyzing a frequency pattern of input signals of the microphones 300. For example, the processor 120 may generate pattern data if the frequency pattern of the input signals of the microphones 300 is identical with or similar to a reference frequency pattern when the user input is detected.

Figure 6E:
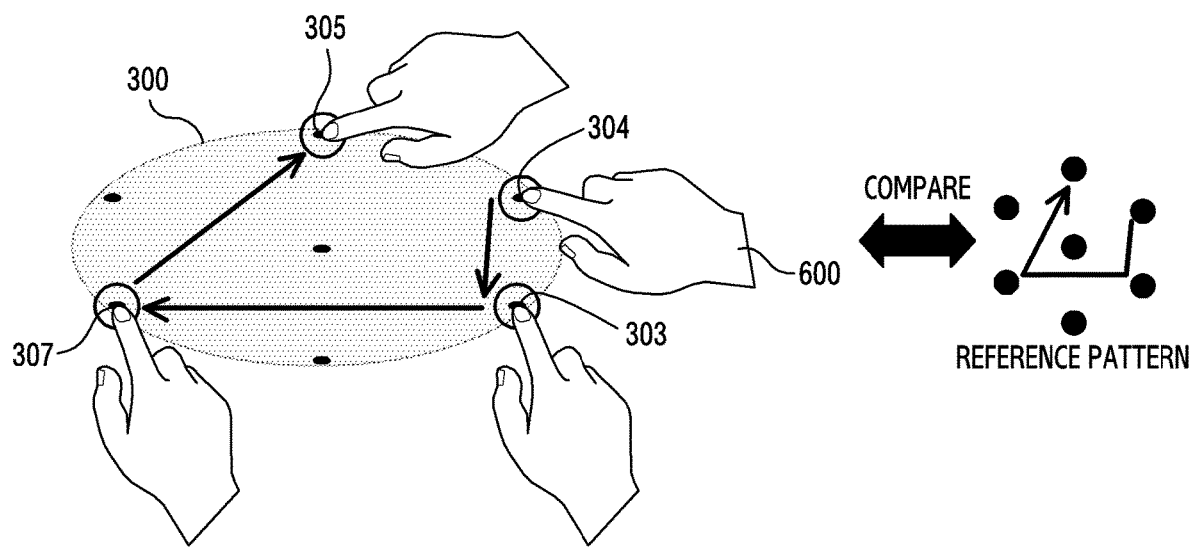

In operation 505, the electronic device 101 may execute a function corresponding to the pattern data. For example, the processor 120 may compare the pattern data with a reference pattern list, and identify a reference pattern corresponding to the pattern data in the reference pattern list. The processor 120 may execute a function corresponding to the identified reference pattern. For example, the processor 120 may execute a function for turning on the electronic device 101 in response to the pattern data corresponding to the gesture which sweeps the second microphone 302 as shown in FIG. 6A, may execute a function for turning off the electronic device 101 in response to the pattern data corresponding to the gesture which blocks the second microphone 302 as shown in FIG. 6B, may increase the volume of the electronic device 101 in response to the pattern data corresponding to the gesture which moves from the first microphone 301 toward the second microphone 302 as shown in FIG. 6C, and may decrease the volume of the electronic device 101 in response to the pattern data corresponding to the gesture which moves from the first microphone 301 toward the third microphone 303 as shown in FIG. 6D. For example, the processor 120 may compare pattern data corresponding to a gesture which passes the fourth microphone 304, the third microphone 303, the seventh microphone 307, and the fifth microphone 305 in sequence as shown in FIG. 6E, with the reference pattern, and execute a corresponding function (e.g., unlock the electronic device 101) if the pattern data and the reference pattern match.

Figure 7:
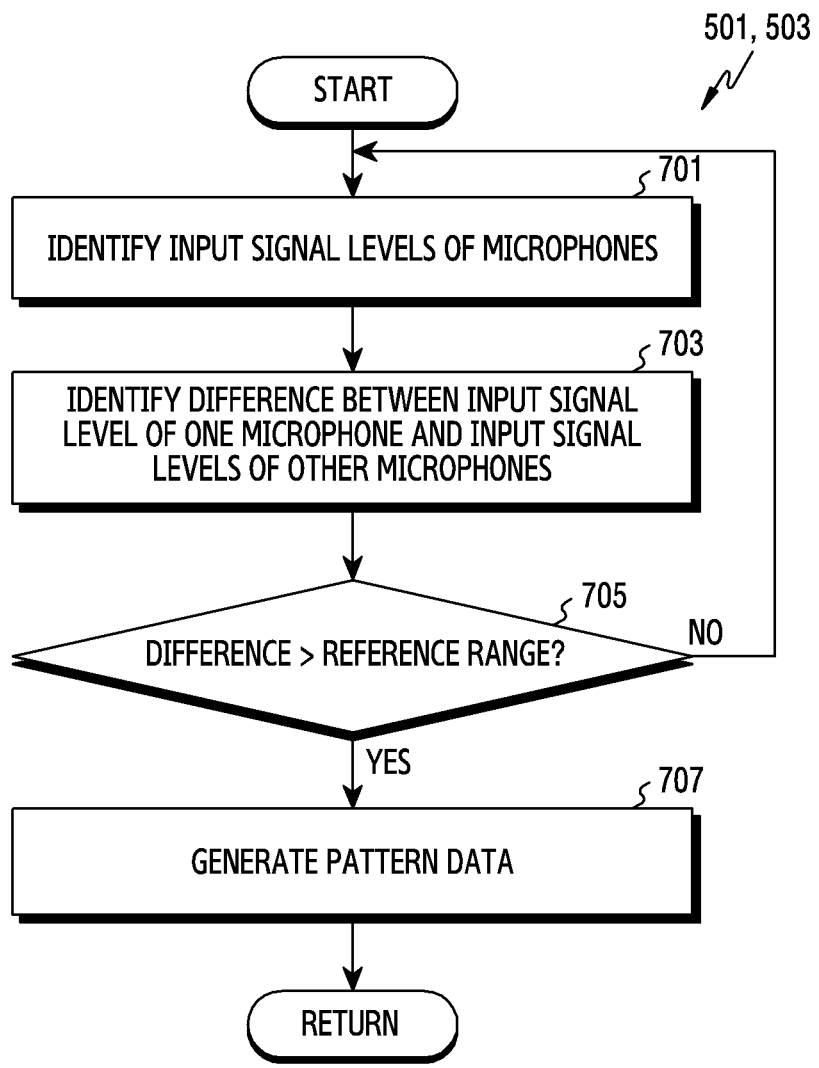
FIG. 7 is a flowchart of a method for generating pattern data based on input signal level differences of microphones in an electronic device according to certain embodiments of the present disclosure.
Figure 8A:
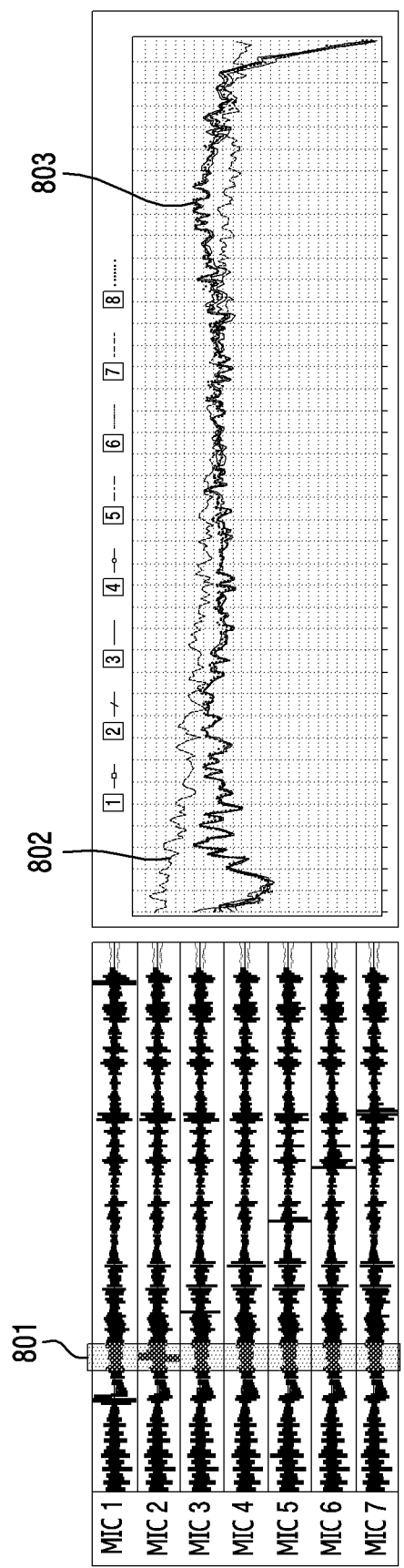
FIG. 8A and FIG. 8B are diagrams of input signal level differences of microphones in an electronic device according to certain embodiments of the present disclosure.
Figure 8B:
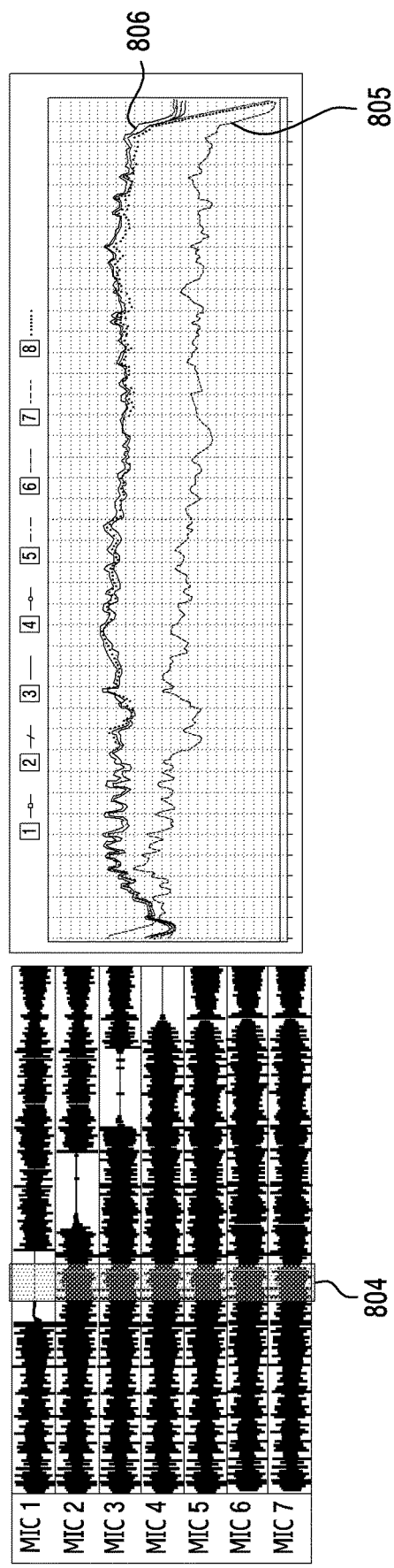

FIG. 7 is a flowchart of a method for generating pattern data based on input signal level differences of microphones in an electronic device according to certain embodiments of the present disclosure. FIG. 8A and FIG. 8B are diagrams of input signal level differences of microphones in an electronic device according to certain embodiments of the present disclosure. The following describes operations for generating pattern data based on the input signal level differences of the microphones in operations 501 and 503 of FIG. 5. The electronic device may include the electronic device 101 of FIG. 1, the electronic device 101 of FIG. 3, the electronic device 101 of FIG. 4A and FIG. 4B, or at least part (e.g., the processor 120) of the electronic device 101.

Referring to FIG. 7, in operation 701, the electronic device 101 may identify input signal levels of the microphones 300 of FIG. 3. For example, the processor 120 may receive input signals corresponding to the first microphone 301 through the seventh microphone 307 via the microphones 300, and identify levels (e.g., frequency amplitudes) of the received input signals. For example, FIG. 8A and FIG. 8B depict a frequency response curve of the input signals. The processor 120 may identify the levels of the input signals based on frequency response characteristics of the input signals.

In operation 703, the electronic device 101 may identify a difference between the input signal level of the microphones and the input signal level of other microphones. For example, if the difference between the input signal level of the microphones and the input signal level of other microphones exceeds a threshold, the processor 120 may identify the difference between the input signals. For example, the frequency response curve of FIG. 8A may be a frequency response curve when the user sweeps the second microphone 302. For example, in FIG. 8A, at a timing 801 of the user sweeping, the processor 120 may identify a difference between the level (e.g., frequency amplitude) of an input signal 802 of the second microphone 302 and the level of input signals 803 of the other microphones 301 and 303 through 307. For example, the frequency response curve of FIG. 8B may be a frequency response curve when the user blocks the first microphone 301. For example, in FIG. 8B, at a timing 804 of the user blocking, the processor 120 may identify a difference between the level (e.g., frequency amplitude) of an input signal 805 of the first microphone 301 and the level of input signals 806 of the other microphones 302 through 307.

In operation 705, the electronic device 101 may identify whether the difference between the input signal level of the microphones and the input signal level of the other microphones exceeds a reference range. For example, the reference range may be a frequency range over a specific level. For example, the processor 120 may identify whether the input signal level of the microphones differs from the input signal level of other microphones over a specific frequency range. For example, if the level of the input signal 802 of the second microphone 302 is different from the level of the input signals 803 of the other microphones 301 and 303 through 307 over half of a frequency axis (X axis) as shown in FIG. 8A, the processor 120 may identify that the difference between the level of the input signal 802 of the second microphone 302 and the level of the input signals 803 of the other microphones 301 and 303 through 307 exceeds the reference range. If the level of the input signal 805 of the first microphone 301 is different from the level of the input signals 806 of the other microphones 302 through 307 over half of the frequency axis (X axis) as shown in FIG. 8B, the processor 120 may identify that the difference between the level of the input signal 805 of the first microphone 301 and the level of the input signals 806 of the other microphones 302 through 307 exceeds the reference range.

If the difference between the input signal level of the microphones and the input signal level of the other microphones falls below the reference range, the electronic device 101 may return to operation 701. For example, the processor 120 may periodically identify the input signal levels of the microphones.

By contrast, if the difference between the input signal level of the microphones and the input signal level of the other microphones exceeds the reference range, the electronic device 101 may generate pattern data in operation 707. For example, the processor 120 may generate pattern data in response to the sweeping at the second microphone 302 in FIG. 8A. For example, the processor 120 may generate pattern data in response to the blocking at the first microphone 301 in FIG. 8B.

Figure 9:
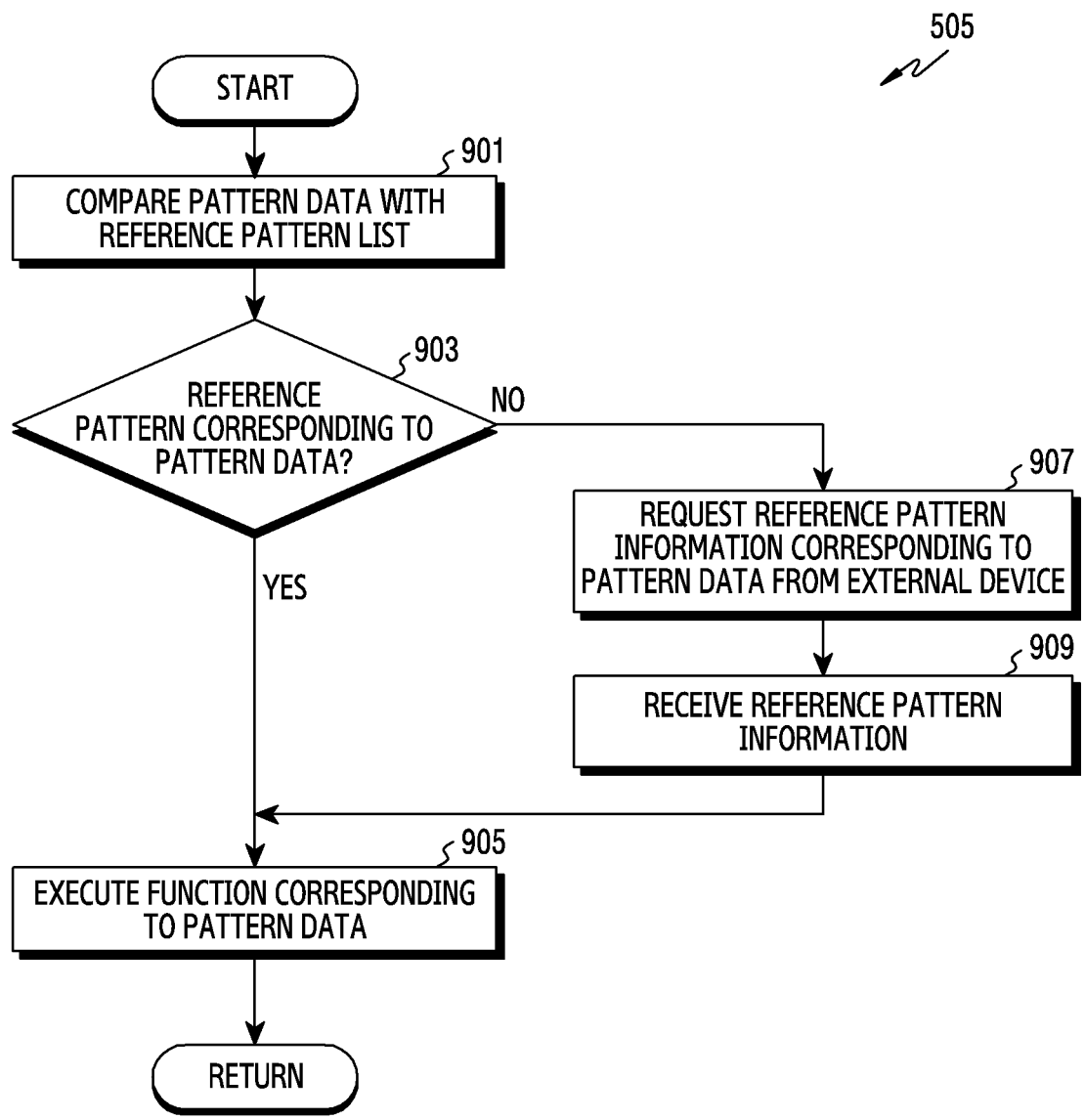
FIG. 9 is a flowchart of a method for executing a function corresponding to pattern data by comparing the pattern data with a reference pattern in an electronic device according to certain embodiments of the present disclosure.

FIG. 9 is a flowchart of a method for executing a function corresponding to pattern data by comparing pattern data with a reference pattern in an electronic device according to certain embodiments of the present disclosure. The following describes operations for executing the function corresponding to the pattern data in operation 505 of FIG. 5. The electronic device may include the electronic device 101 of FIG. 1, the electronic device 101 of FIG. 3, the electronic device 101 of FIG. 4A and FIG. 4B, or at least part (e.g., the processor 120) of the electronic device 101.

Referring to FIG. 9, in operation 901, the electronic device 101 may compare pattern data with a reference pattern list. For example, the processor 120 may pre-store the reference pattern list in the memory of FIG. 1. For example, the reference pattern list may include a plurality of reference patterns and functions corresponding to the reference patterns respectively. For example, the reference pattern list may include at least one of a first reference pattern (sweeping the second microphone 302 in FIG. 6A) and a corresponding first function (turn on the electronic device 101), a second reference pattern (blocking the second microphone 302 in FIG. 6B) and a corresponding second function (turn off the electronic device 101), a third reference pattern (the gesture moving from the first microphone 301 toward the second microphone 302 in FIG. 6C) and a corresponding third function (increase the volume of the electronic device 101), a fourth reference pattern (the gesture moving from the first microphone 301 toward the third microphone 303 in FIG. 6D) and a corresponding fourth function (decrease the volume of the electronic device 101), and a fifth reference pattern (the gesture sequentially passing the fourth microphone 304, the third microphone 303, the seventh microphone 307, and the fifth microphone 305 in FIG. 6E) and a corresponding fifth function (unlock the electronic device 101).

In operation 903, the electronic device 101 may identify whether there is a reference pattern corresponding to the pattern data. For example, the processor 120 may identify whether the reference patterns of the reference pattern list include a reference pattern corresponding to the pattern data.

With the reference pattern corresponding to the pattern data, the electronic device 101 may execute a function corresponding to the pattern data in operation 905. For example, if the first reference pattern (sweeping the second microphone 302 in FIG. 6A) matches the pattern data which sweeps the second microphone 302, the processor 120 may execute the first function (turn on the electronic device 101) corresponding to the first reference pattern. Next, the electronic device 101 may return to operation 501 of FIG. 5 or operation 701 of FIG. 7.

With no reference pattern corresponding to the pattern data, the electronic device 101 may request reference pattern information corresponding to the pattern data from an external device in operation 907. For example, the processor 120 may identify that the reference pattern list does not include the pattern data which sweeps the first microphone 301, and request the reference pattern information from the external device in order to execute a function corresponding to the pattern data. For example, the external device may be a server, an external storage device, or a control device (e.g., a smart home hub) of peripherals. For example, the reference pattern information may include the reference pattern and the corresponding function.

In operation 909, the electronic device 101 may receive the reference pattern information from the external device. For example, the processor 120 may receive the reference pattern information (e.g., the reference pattern and the corresponding function) corresponding to the pattern data through the communication module 190 of FIG. 1.

According to an embodiment, the electronic device 101 may receive a message indicating no reference pattern information corresponding to the pattern data from the external device, and finish this process or periodically identify the input signal levels of the microphones.

If receiving the reference pattern information from the external device, the electronic device 101 may execute a function corresponding to the pattern data in operation 905. For example, based on the reference pattern information, the processor 120 may identify a sixth reference pattern corresponding to the pattern data which sweeps the first microphone 301, and execute a function (mute the electronic device 101) corresponding to the sixth reference pattern.

According to an embodiment, with no reference pattern corresponding to the pattern data, the electronic device 101 may finish this process and not execute a particular function, without proceeding to operations 907 and 909.

Figure 10:
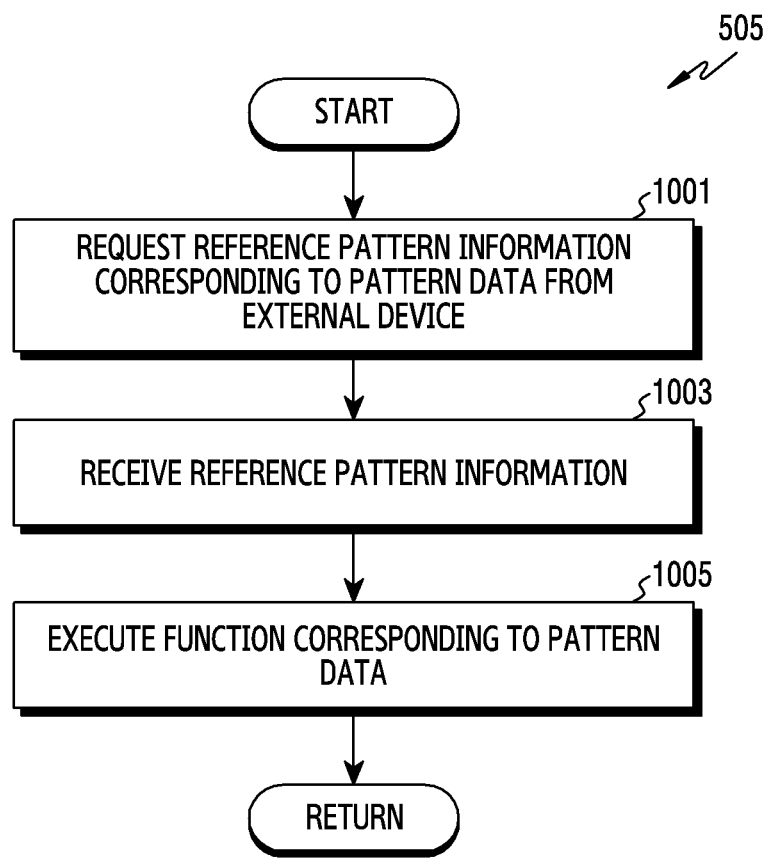
FIG. 10 is a flowchart of a method for executing a function corresponding to pattern data by receiving reference pattern information from an external device in an electronic device according to certain embodiments of the present disclosure.

FIG. 10 is a flowchart of a method for executing a function corresponding to pattern data by receiving reference pattern information from an external device in an electronic device according to certain embodiments of the present disclosure. The following describes operations for executing the function corresponding to the pattern data in operation 505 of FIG. 5. The electronic device may include the electronic device 101 of FIG. 1, the electronic device 101 of FIG. 3, the electronic device 101 of FIG. 4A and FIG. 4B, or at least part (e.g., the processor 120) of the electronic device 101.

Referring to FIG. 10, the electronic device 101 may request reference pattern information corresponding to pattern data from an external device in operation 1001. For example, the electronic device 101 may not store a separate reference pattern list in the memory 130 of FIG. 1. Hence, the processor 120 may transmit a message for requesting the reference pattern information corresponding to the pattern data, to the external device through the communication module 190 of FIG. 1. For example, the external device may be a server, an external storage device, or a control device (e.g., a smart home hub) of peripherals. For example, the reference pattern information may include the reference pattern list. For example, the reference pattern list may include a plurality of reference patterns and corresponding functions.

In operation 1003, the electronic device 101 may receive the reference pattern information. For example, the processor 120 may receive from the external device the reference pattern information including the reference pattern list through the communication module 190 of FIG. 1.

In operation 1005, the electronic device 101 may execute a function corresponding to the pattern data. For example, based on the reference pattern list of the reference pattern information, the processor 120 may identify a third reference pattern corresponding to the pattern data which moves from the first microphone 301 toward the second microphone 302, and execute a third function (increase the volume of the electronic device 101) corresponding to the third reference pattern.

According to an embodiment, the electronic device 101 may receive from the external device a message indicating no reference pattern corresponding to the pattern data, and finish this process or periodically identify input signal levels of the microphones.

Figure 11:
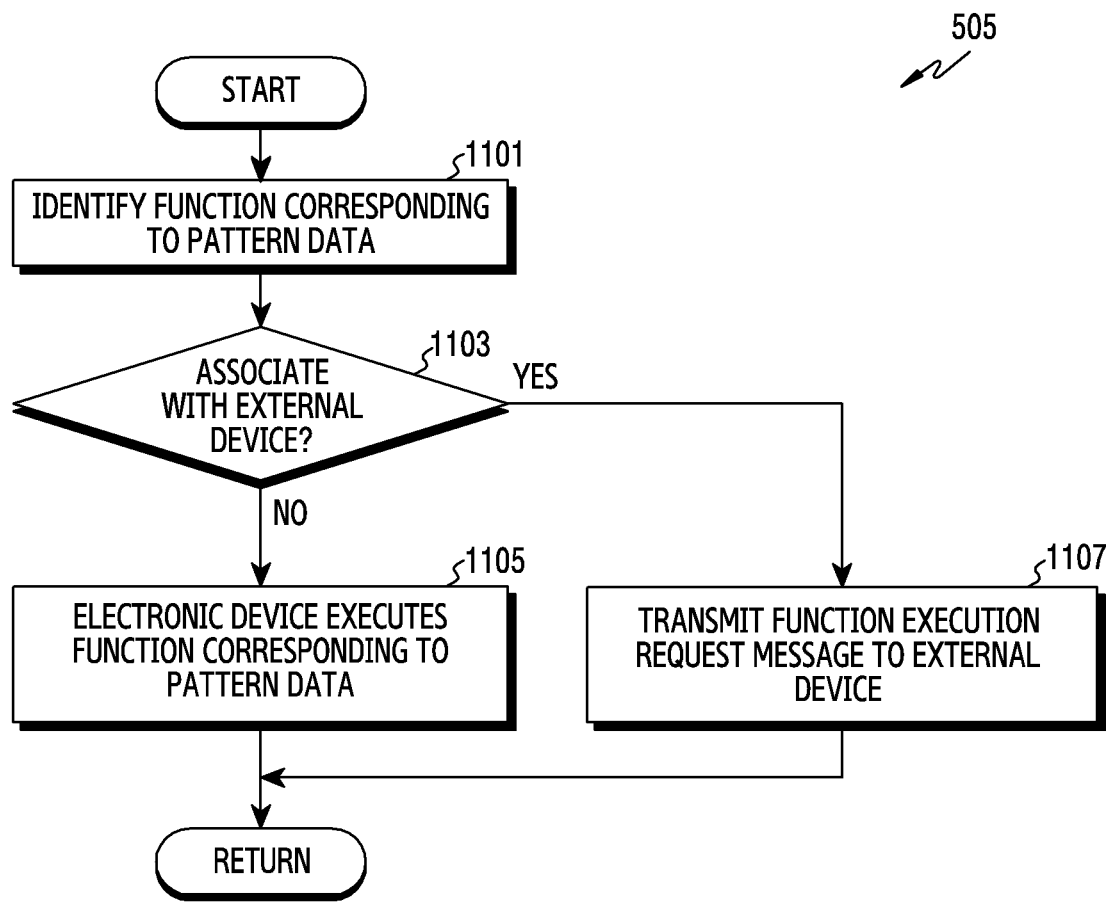
FIG. 11 is a flowchart of a method for executing a function corresponding to pattern data by associating with an external device in an electronic device according to certain embodiments of the present disclosure.

FIG. 11 is a flowchart of a method for executing a function corresponding to pattern data by associating with an external device in an electronic device according to certain embodiments of the present disclosure. The following describes operations for executing the function corresponding to the pattern data in operation 505 of FIG. 5. The electronic device may include the electronic device 101 of FIG. 1, the electronic device 101 of FIG. 3, the electronic device 101 of FIG. 4A and FIG. 4B, or at least part (e.g., the processor 120) of the electronic device 101.

Referring to FIG. 11, the electronic device 101 may identify a function corresponding to pattern data in operation 1101. For example, the function may or may not be executed at the electronic device 101. The function may be executed by the electronic device and an external device. For example, the function corresponding to the pattern data may be any one of a first function (turn on the volume of the device), a second function (turn on the external device), or a third function (display contents).

In operation 1103, the electronic device 101 may determine whether to associate with the external device, based on the identified function. For example, determining whether to associate with the external device may determine which device executes the identified function. For example, associating with the external device may indicate that the electronic device 101 and the external device together execute the identified function or the external device executes the identified function according to a control signal of the electronic device 101. By contrast, not associating with the external device may indicate that the electronic device 101 executes the identified function.

If determining not to associate with the external device, the electronic device 101 may execute a function corresponding to the pattern data in operation 1105. For example, the processor 120 may execute the identified first function (turn the sound of the device on) through the sound output device 155 of FIG. 1. For example, the processor 120 may execute the identified third function (display contents) through the display device 160 of FIG. 1.

If determining to associate with the external device, the electronic device 101 may transmit a function execution request message to the external device in operation 1107.

According to an embodiment, if determining to execute the function at the external device according to the control signal of the electronic device 101, the processor 120 may transmit a function execution request message to the external device through the communication module 190 of FIG. 1. For example, if the identified function is a second function (turn on the external device), the electronic device 101 may not execute the second function and thus the processor 120 may transmit the request message corresponding to the second function to the external device through the communication module 190 of FIG. 1. For example, if the external device is a smart lamp, the external device receiving the request message may emit light to outside. For example, if the electronic device 101 is an artificial intelligence speaker including no display or having a limited area and the identified function is a third function (display contents), the processor 120 may determine to display contents at the external device, rather than the electronic device 101, and transmit a request message corresponding to the third function to the external device through the communication module 190. For example, if the sound output device 155 of the electronic device 101 has low specifications and the external device is a high-specification speaker, the processor 120 may determine to output sound through the external device and transmit a request message corresponding to the first function (turn the sound of the device on) to the external device through the communication module 190.

According to an embodiment, if determining to execute the identified function at the electronic device 101 and the external device, the processor 120 may transmit a function execution request message to the external device through the communication module 190. For example, if the identified function is the first function (turn the sound of the device on), the processor 120 may turn on its sound output device 155 and transmit a request message corresponding to the first function to the external device through the communication module 190. Thus, the user may listen to the sound through both of the electronic device 101 and the external device.

According to an embodiment, if determining to associate with the external device, the electronic device 101 may provide the user with a message for selecting whether the electronic device 101 and the external device execute the identified function. For example, the processor 120 may display a message for selecting whether the electronic device 101 and the external device execute the identified function, at the display device 160 of the electronic device 101. In addition, the processor 120 may output a sound message for selecting whether the electronic device 101 and the external device execute the identified function, through the sound output device 155 of FIG. 1.

According to an embodiment, after operation 1105 or operation 1107, the electronic device 101 may detect a user input or identify the input signal levels of the microphones.

Figure 12:
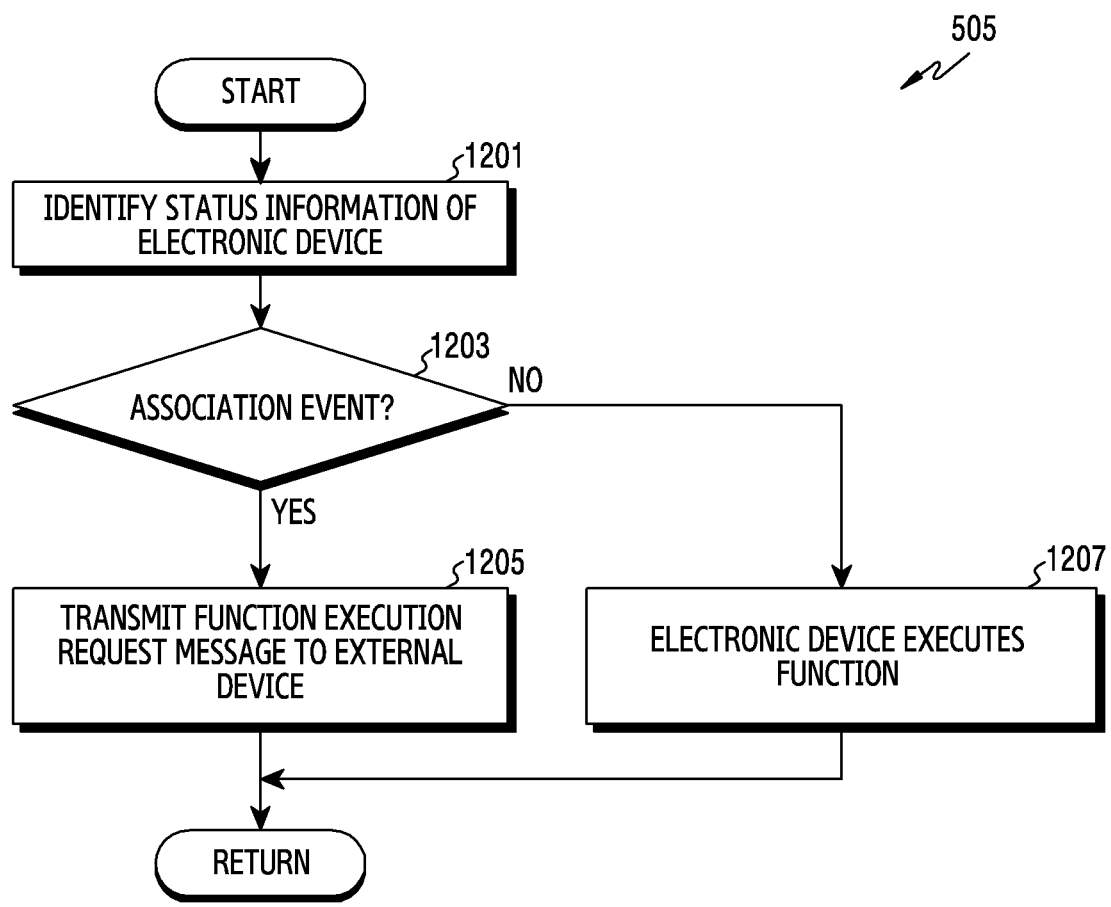
FIG. 12 is a flowchart of a method for executing a function corresponding to pattern data based on status information in an electronic device according to certain embodiments of the present disclosure.

FIG. 12 is a flowchart of a method for executing a function corresponding to pattern data based on status information in an electronic device according to certain embodiments of the present disclosure. The following describes operations for executing the function corresponding to the pattern data in operation 505 of FIG. 5. The electronic device may include the electronic device 101 of FIG. 1, the electronic device 101 of FIG. 3, the electronic device 101 of FIG. 4A and FIG. 4B, or at least part (e.g., the processor 120) of the electronic device 101.

Referring to FIG. 12, in operation 1201, the electronic device 101 may identify its status information. For example, the status information of the electronic device may include at least one of a battery level, usage of the processor 120, a set display brightness, current consumed by the electronic device 101, RF transmit power, or sensing information regarding a motion of the electronic device 101.

In operation 1203, the electronic device 101 may determine, based on its status information, whether an association event occurs. For example, the processor 120 may determine whether the association event occurs, based on at least one of the battery level, the usage of the processor 120, the set display brightness, the current consumed by the electronic device 101, the RF transmit power, or the sensing information regarding a motion of the electronic device 101. For example, the association event may be an event for selecting a device for function execution. For example, if the battery level of the electronic device 101 is below a reference level, the processor 120 may select the external device as the function execution device in order to prevent power consumption. By contrast, if the battery level exceeds the reference level, the processor 120 may select the electronic device 101 as the function execution device.

If the association event occurs, the electronic device 101 may transmit a function execution request message to the external device in operation 1205. For example, if the battery level of the electronic device 101 is below the reference level, the processor 120 may transmit a function execution request message to the external device through the communication module 190 of FIG. 1.

By contrast, if the association event does not occur, the electronic device 101 may execute the function in operation 1207. For example, if the battery level of the electronic device 101 is higher than the reference level, the processor 120 may execute the function at the electronic device 101.

According to an embodiment, after operation 1205 or operation 1207, the electronic device 101 may detect a user input or identify input signal levels of the microphones.

According to certain embodiments of the present disclosure, a method for operating an electronic device may include detecting a user input at a plurality of microphones, generating pattern data based on the user input, and executing a function corresponding to the pattern data.

According to certain embodiments, the user input may include at least one of sweeping, blocking, or tap.

According to certain embodiments, generating the pattern data may include identifying input signal levels of the plurality of the microphones, identifying a difference between the input signal level of one of the microphones and the input signal levels of other microphones, identifying whether the difference exceeds a reference range, and if the difference exceeds the reference range, generating the pattern data.

According to certain embodiments, executing the function corresponding to the pattern data may include comparing the pattern data with a reference pattern list, identifying whether there is a reference pattern corresponding to the pattern data in the reference pattern list, and if there is the reference pattern corresponding to the pattern data, executing the function corresponding to the pattern data.

According to certain embodiments, the method may further include, if there is no reference pattern corresponding to the pattern data, requesting reference pattern information corresponding to the pattern data from an external device, receiving the reference pattern information from the external device, and executing the function corresponding to the pattern data, based on the reference pattern information.

According to certain embodiments, executing the function corresponding to the pattern data may include requesting reference pattern information corresponding to the pattern data from an external device, receiving the reference pattern information from the external device, and executing the function corresponding to the pattern data, based on the reference pattern information.

According to certain embodiments, executing the function corresponding to the pattern data may include identifying a function corresponding to the pattern data, determining whether to associate with an external device, based on the identified function, and, if determining to associate with the external device, transmitting a message for requesting to execute the identified function to the external device.

The method may further include, if determining not to associate with the external device, executing the function corresponding to the pattern data at the electronic device.

According to certain embodiments, executing the function corresponding to the pattern data may include identifying status information of the electronic device, determining whether an association event occurs, based on the status information, and, if the association event occurs, transmitting a message for requesting to execute the function corresponding to the pattern data, to the external device.

According to certain embodiments, the status information may include at least one of a battery level, processor usage, set display brightness, current consumed by the electronic device, RF transmit power, or sensing information regarding a motion of the electronic device.

An electronic device and its operating method according to certain embodiments may detect a user's physical input through a plurality of microphones and thus achieve a simplified structure of the electronic device, manufacturing cost reduction of the electronic device, and various designs of the electronic device, by removing a separate physical input means.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a plurality of microphones; and
a processor, wherein the processor is configured to:
   detect a user input on a surface of the electronic device proximate to the plurality of the microphones, the user input generating sound detected by the plurality of microphones,
   detect whether a difference between a first input level of the sound at a first microphone and a second input level of the sound at a second microphone exceeds a prespecified threshold,
   responsive to detecting that the prespecified threshold is exceeded, generate pattern data based on the sound, and
   when the generated pattern data corresponds to a function, execute the function corresponding to the generated pattern data.

2. The electronic device of claim 1, wherein the user input comprises at least one of sweeping, blocking, or tap.

3. The electronic device of claim 1, wherein the processor is configured to:
   compare the pattern data with a reference pattern list,
   identify that there is a reference pattern corresponding to the pattern data in the reference pattern list, and in response to identifying that there is the reference pattern corresponding to the pattern data, execute the function corresponding to the pattern data.

4. The electronic device of claim 3, wherein the processor is configured to:
in response to identifying that there is no reference pattern corresponding to the pattern data, request reference pattern information corresponding to the pattern data from an external device,
receive the reference pattern information from the external device, and
execute, based on the reference pattern information, the function corresponding to the pattern data.

5. The electronic device of claim 1, wherein the processor is configured to:
request reference pattern information corresponding to the pattern data from an external device,
receive the reference pattern information from the external device, and
execute the function corresponding to the pattern data, based on the reference pattern information.

6. The electronic device of claim 1, wherein the processor is configured to:
identify the function corresponding to the pattern data, determine whether to associate with an external device, based on the identified function, and
if determining to associate with the external device, transmit a message for requesting to execute the identified function by the electronic device to the external device.

7. The electronic device of claim 6, wherein the processor is configured to, if determining not to associate with the external device, execute the function corresponding to the pattern data at the electronic device.

8. The electronic device of claim 6, wherein the processor is configured to:
identify status information of the electronic device, determine, based on the status information, whether an association event occurs, and
if the association event occurs, transmit a message for requesting to execute the function corresponding to the pattern data, to the external device.

9. The electronic device of claim 8, wherein the status information comprises at least one of a battery level, processor usage, set display brightness, current consumed by the electronic device, radio frequency (RF) transmit power, or sensing information regarding a motion of the electronic device.

10. A method for operating an electronic device, comprising:
detecting a user input on a surface of the electronic device proximate to a plurality of microphones, the user input generating sound detected by the plurality of microphones;
detecting whether a difference between a first input level of the sound at a first microphone and a second input level of the sound at a second microphone exceeds a prespecified threshold;
responsive to detecting that the prespecified threshold is exceeded, generating pattern data based on the sound; and
when the generated pattern data corresponds to a function, executing the function corresponding to the generated pattern data.

11. The method of claim 10, wherein the user input comprises at least one of sweeping, blocking, or tap.

12. The method of claim 10, wherein executing the function corresponding to the pattern data comprises:
comparing the pattern data with a reference pattern list;
identifying that there is a reference pattern corresponding to the pattern data in the reference pattern list; and
in response to identifying that there is the reference pattern corresponding to the pattern data, executing the function corresponding to the pattern data.

13. The method of claim 12, further comprising:
in response to identifying that there is no reference pattern corresponding to the pattern data, requesting reference pattern information corresponding to the pattern data from an external device;
receiving the reference pattern information from the external device; and
executing, based on the reference pattern information, the function corresponding to the pattern data.

14. The method of claim 10, wherein executing the function corresponding to the pattern data comprises:
requesting reference pattern information corresponding to the pattern data from an external device;
receiving the reference pattern information from the external device; and
executing the function corresponding to the pattern data, based on the reference pattern information.

15. The method of claim 10, wherein executing the function corresponding to the pattern data comprises:
identifying a function corresponding to the pattern data;
determining whether to associate with an external device, based on the identified function; and
if determining to associate with the external device, transmitting a message for requesting to execute the identified function by the electronic device to the external device.

16. The method of claim 15, further comprising:
if determining not to associate with the external device, executing the function corresponding to the pattern data at the electronic device.

17. The method of claim 15, wherein executing the function corresponding to the pattern data comprises:
identifying status information of the electronic device;
determining, based on the status information, whether an association event occurs; and
if the association event occurs, transmitting a message for requesting to execute the function corresponding to the pattern data, to the external device.

18. The method of claim 17, wherein the status information comprises at least one of a battery level, processor usage, set display brightness, current consumed by the electronic device, radio frequency (RF) transmit power, or sensing information regarding a motion of the electronic device.

* * * * *